(No Model.)
C. P. STEINMETZ.
SYSTEM OF ELECTRICAL DISTRIBUTION.
No. 533,379. Patented Jan. 29, 1895.
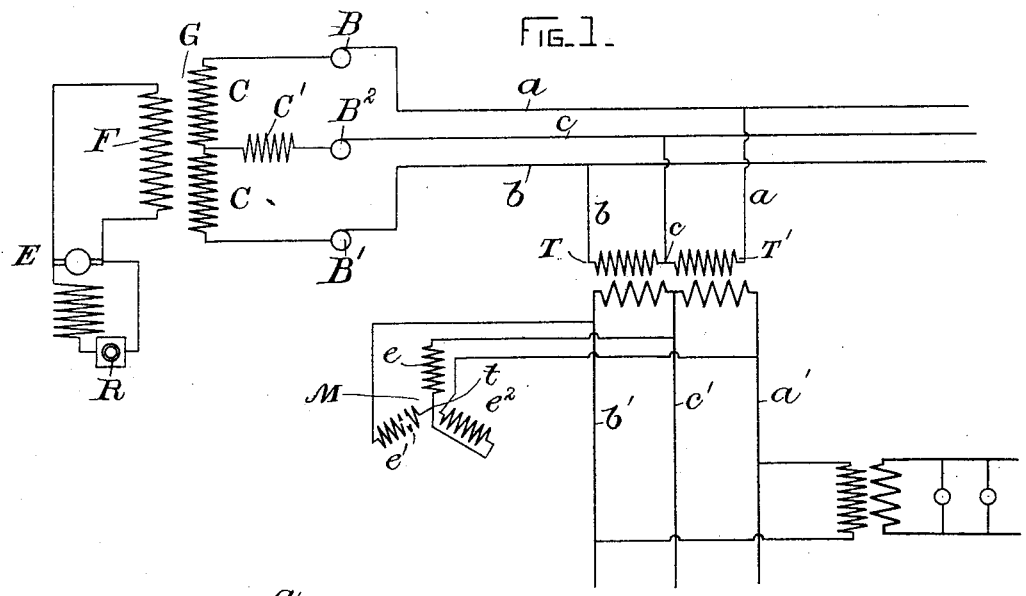
Fig. 1.
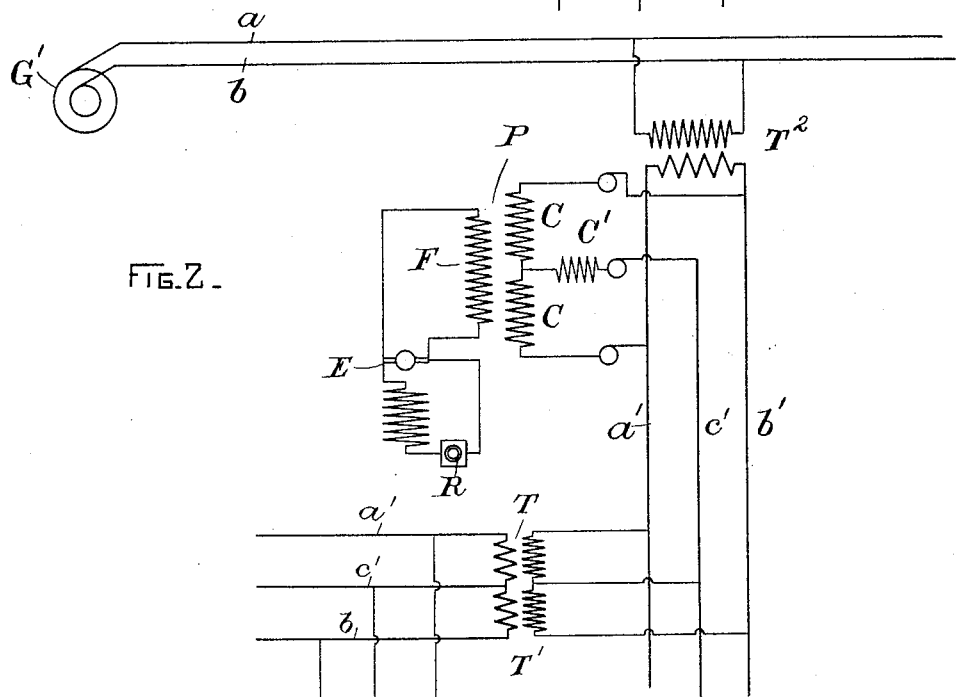
Fig. 2.
WITNESSES
A. F. Macdonald
B. B. Hull
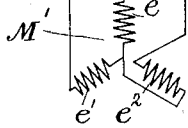
INVENTOR
Charles P. Steinmetz
By Geo. R. Blodgett
Atty

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 533,379, dated January 29, 1895.

Application filed April 11, 1894. Renewed December 24, 1894. Serial No 532,895. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

My invention relates to a system of electrical distribution for polyphase currents, and its principal novel feature consists in an arrangement whereby motors of the three-phase type may be operated from line circuits in which flow currents sixty degrees apart in phase, with only a slight change in the construction of the motors from that of ordinary well-known machines of this class. This change consists in reversing one of the three coils of the motor so that the current flows through this reversed coil in an opposite direction from that in the ordinary motor, and thereby produces the same effects so far as the operation of the motor is concerned as have been heretofore secured by currents differing in phase by one hundred and twenty degrees.

In the accompanying drawings, Figure 1 shows in diagram a system of distribution embodying the invention, and Fig. 2 shows in a similar manner, a somewhat modified system of distribution also embodying the invention.

In Fig. 1, G is a generator of the "monocyclic type" as I term it. It is constructed in the same manner as the ordinary single-phase alternating dynamo, except that there is added a phase-modifying coil on the armature for maintaining an out-of-phase electro-motive force upon a third main, constituting with the other mains an interconnected polyphase circuit. The field coils of the generator are represented at F, and are in circuit with a direct current exciting machine E, which is shunt-wound, and is regulated by a resistance R in the shunt winding. The main armature coil of the generator is shown at C, having its terminals connected through collector rings and brushes B, B', with distributing mains $a$, $b$. A phase-modifying coil C' is connected at one end with a central point in the main winding C, and its free terminal leads to a circuit main $c$, through a collector ring and brush $B^2$. The phase-modifying coil occupies a displaced position in the field of force relatively to the main coil of substantially ninety degrees. With this arrangement out-of-phase electro-motive forces will be maintained between the mains $a$, $c$, and $b$, $c$, which in this instance are assumed to differ by substantially sixty degrees. This phasal relation is secured by properly proportioning the windings of the main and supplementary coils, so that the resultant electro-motive forces generated by the coil C' and the respective halves of the main winding differ in phase by the desired amount.

For transforming the currents flowing on the mains to a lower potential, I use two transformers T, T', whose primary windings are connected in series and which are coupled at their free terminals and at the central point $c$, with the three mains $a$, $b$, $c$. The secondary windings of the transformers are joined in series and connected in an exactly similar manner to secondary mains $a'$, $b'$, $c'$. A three-phase motor M, is provided with the three usual coils $e$, $e'$, $e^2$, two of which, $e$ and $e'$ have corresponding terminals connected at a common joint $t$, while the third coil has its opposite terminal connected to the same joint. The winding, it will be observed, is of the usual Y-pattern and differs from the ordinary construction only in the reversal of the coil $e^2$. The free terminals of the coils are connected respectively to the mains $a'$, $b'$, $c'$. With this arrangement currents flow between the mains $a'$, $c'$, and $b'$, $c'$, which differ by sixty degrees in phase, but by reversing the direction of the current in the coil $e^2$, the relation of the currents, so far as the operation of the motor is concerned, is changed so that the motor operates in a similar manner to any ordinary three-phase motor when its terminals are connected to mains carrying currents one hundred and twenty degrees apart in phase.

In Fig. 2, G' represents an ordinary single-phase alternating dynamo supplying single-phase currents to mains $a$, $b$, which are transformed to a lower potential by the transformer $T^2$. A phase-converter P is wound with main and phase-modifying coils C, C', arranged relatively to one another in the same manner as the corresponding windings upon the generator G, illustrated in Fig. 1. The exciting current which flows through the field winding F is in this case also supplied by a continuous current exciter E, shunt-wound and provided with a resistance R in the shunt winding for permitting ready regulation. The machine P will maintain upon the main $c'$ which is connected with the free terminal of the phase-modifying coil C', an out-of-phase electro-motive force such that currents differing by sixty degrees in phase may be derived from the mains $a'$, $c'$, and $b'$, $c'$. These currents are transformed by transformers T, T', which are connected in circuit in the same manner as the corresponding transformers in Fig. 1. The secondary currents upon the mains $a'$, $b'$, $c'$, may thus be given any desired potential, though their phase relation will be the same as that existing on the primary side of the transformers. A three-phase motor M' having coils $e$, $e'$, $e^2$, may be operated with currents derived from these mains in the same manner as motor M in Fig. 1, the winding of the motor being the same, and the coil $e^2$ being reversed.

In fact, the system of distribution illustrated in Fig. 2 is very similar to that of Fig. 1, except that the monocyclic currents are not generated directly at the power station, but are derived from single-phase currents at convenient points in the system where three-phase motors are installed. The machines wound as are the motors M, M', may also serve as generators when driven by a suitable source of power. They will then generate currents of the same phase relation as they receive when running as motors that are of the same phase as the monocyclic generator G, in Fig. 1, as already explained. Hence in the claims which are hereinafter made for the machine as distinguished from the system of distribution of which the machines form a part, I intend to cover its use both as a generator and a motor.

What I claim as new, and desire to secure by Letters Patent of the United States, is—

1. The method of distribution herein described, which consists in generating and distributing to a desired point or points polyphase currents approximately sixty degrees apart in phase, and operating motors of the three-phase type thereby by reversing the direction of the current flowing in one of the windings of the motor, as set forth.

2. The combination in a dynamo electric machine of the three-phase type, of three magnetizing coils connected at one end to a common joint, and at their free ends to collector rings or similar circuit terminals, and having one of the coils reversed, as described.

3. The combination of a source of polyphase alternating currents approximately sixty degrees apart in phase, and an interconnected three main circuit for distributing such currents, with a motor of the three-phase type with the coils connected respectively to the circuit mains and having one of its coils reversed, as set forth.

4. A dynamo electric machine of the three-phase type provided with a Y-winding, in which corresponding terminals of two of the coils and the opposite terminal of the third coil are connected to a common joint, and the free terminals to collector rings, in connection with a source of polyphase currents substantially sixty degrees apart in phase which are fed to the motor coils, as set forth.

In witness whereof I have hereunto set my hand this 10th day of April, 1894.

CHARLES P. STEINMETZ.

Witnesses:
B. B. HULL,
GENEVIEVE HAYNES.